United States Patent Office 3,414,396
Patented Dec. 3, 1968

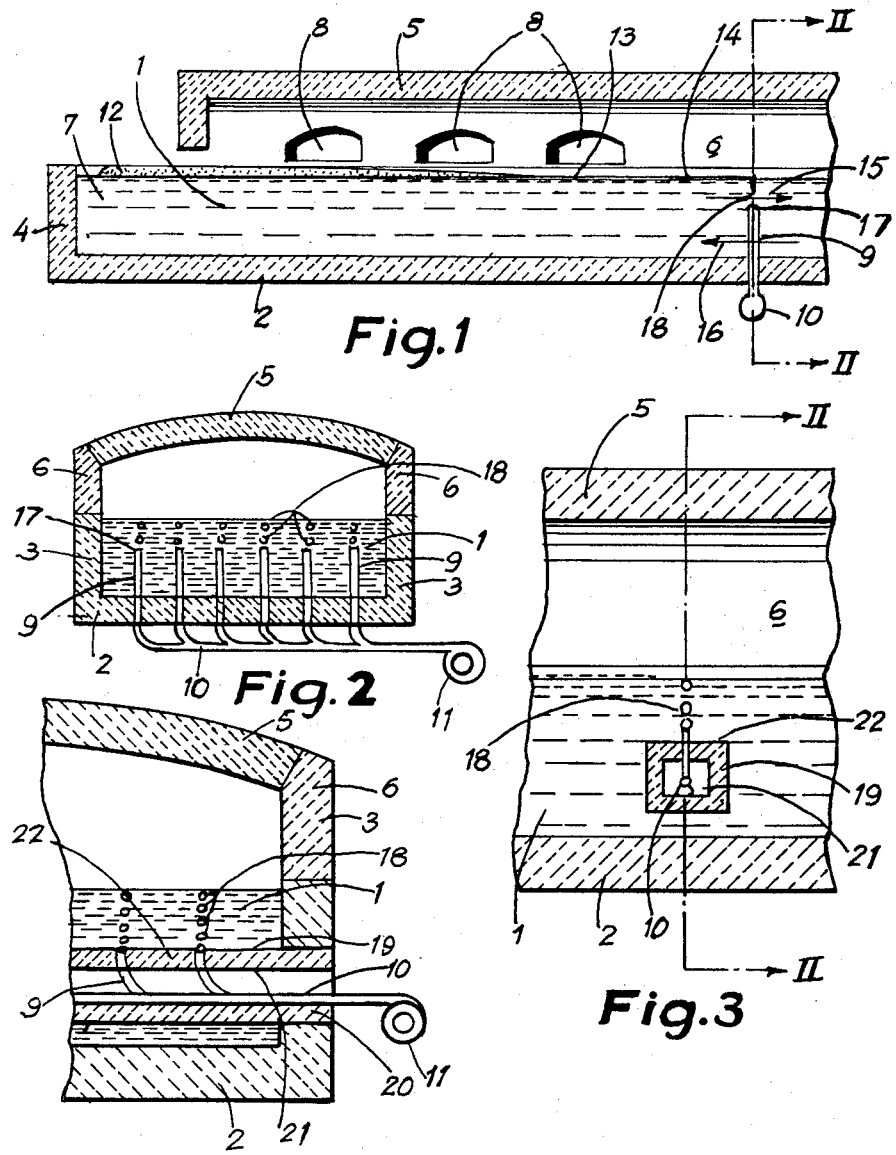

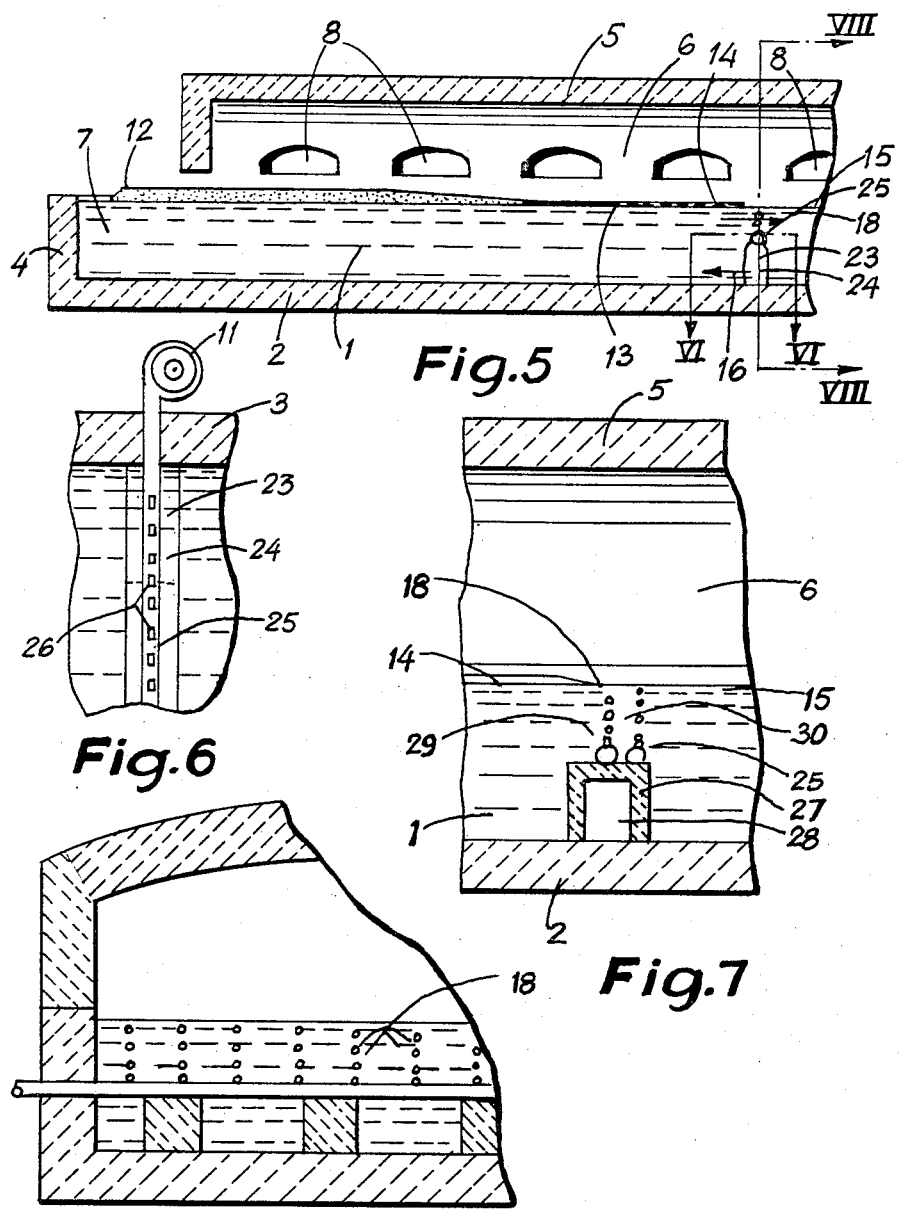

3,414,396
PROCESS FOR HOMOGENIZING GLASS BY GAS INJECTION
Edgard Brichard, Jumet, Belgium, assignor to Glaverbel S.A., Brussels, Belgium
Filed June 7, 1965, Ser. No. 461,654
Claims priority, application Belgium, June 5, 1964, 648,943/64
3 Claims. (Cl. 65—134)

ABSTRACT OF THE DISCLOSURE

In a glass melting system having a melting zone and an extraction zone connected with each other and in which zones a current of molten glass moves from the melting zone to the extraction zone over another current of molten glass which is cooler than the first-mentioned current and which flows in the opposite direction, a method and apparatus for injecting a gas under pressure substantially at the level defining the boundary between the two currents so that the gas only passes through glass forming a part of the first-mentioned current.

---

The present invention relates generally to the glass-maing art, and, more particularly, to a process and apparatus for homogenizing a current of molten glass which flows from a melting zone to the extracting zone of a furnace in which an advancing current moves on top of a returning current of molten glass with the return current being cooler than the first one, and wherein gases under pressure are injected into the molten glass.

Vitrifiable materials are charged or fed into glass molding furnaces of the tank type either in successive batches or in a uniform layer. These materials float on the glass which already is in molten condition and are there exposed to the action of the flames which melt the material. During the heating and melting period the components or ingredients of the mass react with each other to thus form the glass. It is known that a portion of the silica does not react sufficiently with the other components and particularly with the alkalies. Since silica is less dense than glass, the portion that insufficiently reacts forms a molten heterogeneous film which remains on the surface of the glass. This film reacts and mixes only with difficulty with the underlying glass so that it can remain part of this mass in the extraction zone where this heterogeneous layer causes flaws in the finished product.

In the past in order to prevent silica film from leaving the melting compartment, various means have been used. For this purpose dams or barriers have been placed at the surface of the molten glass. However, these elements have a very limited effect and it has been found that a portion of the surface layer passes under the dams and barriers and appears in the extraction compartment.

It has also been attempted to remove the heterogeneous surface layer by skimming it off, that is, by removing it for example above the dams. However, it can be seen that this is a very difficult task to perform and besides this is very expensive.

Another method which has been proposed is the type set forth, for example, in U.S. Patent No. 2,387,222, wherein gases under pressure are injected into the molten glass at the level of the bottom of the furnace so that the gases form bubbles in the glass to provide proper mixing of the molten glass mass. This process did not provide the expected and desired results in the normal tank furnaces. These furnaces contain a relatively thick mass of molten glass and two major currents are formed in this mass. The first current flows from the melting zone to the extracting zone and is on top of the second current. The second current flows in the opposite direction and includes the colder glass. As the gas bubbles rise they pass successively through the two currents, first through the colder current and then through the hotter one. This rising forces the colder glass at the bottom of the tank to partially mix with the current that moves toward the extraction zone. The result is that far from achieving the homogenizing of the glass, on the contrary, heterogeneities are continued to be produced in the glass which is ready to be extracted and shaped or formed.

It has also been proposed for example in U.S. Patent Nos. 2,254,079 and 2,387,222 to reduce the height or thickness of the current of molten glass to a substantial extent in the zone where gases under pressure are injected in order to form a relatively thin layer. It can be seen that by doing this the speed of the current of glass is considerably increased so that the molten glass is subjected to the action of the gas bubbles for a relatively short period of time and therefore, there is less assurance of homogenization than in other processes.

With this in mind it is a main object of the present invention to provide for properly homogenizing a current of molten glass flowing from the melting to the extracting zone.

Another object of the invention is to provide for homogenization of only the warmer portions of the molten glass without mixing the colder portions of the molten glass with those of higher temperature.

A further object of the invention is to provide for the manufacture of glass wherein gases are injected into the molten glass mass in those portions of the current which is fed toward the extraction zone.

These objects and others ancillary thereto are accomplished in accordance with preferred embodiments of the invention wherein a current of molten glass flows from the melting zone toward the extraction zone in a tank furnace. This current advances over a second current which is cooler than the first one and which is flowing in the opposite direction. Gases under pressure are injected into the molten glass.

The gases are injected into the molten mass of glass at the level where the two currents are adjacent to one another. It has been found that under these conditions the gas bubbles do not drag along portions of glass of the relatively colder lower current, and rather effectively act to mix the materials from the surface layer. Furthermore, the gas bubbles incorporate the surface film, which is glass that is rich in silica, into the upper glass current to assure that they are intimately mixed. This incorporation and homogenization are performed quickly and efficiently, that is, approach perfection even though the surface film has relatively low density and high surface tension.

The gases may advantageously be injected into the molten glass mass at a level which is slightly higher than where the two currents are adjacent to each other thereby to avoid the cold glass from being brought into the upper and warmer current of glass.

Additional objects and advantages of the present invention will become apparent upon consideration of the following description when taken in conjunction with the accompanying drawings in which:

FIGURE 1 is a schematic vertical sectional view illustrating a portion of a furnace constructed in accordance with the present invention.

FIGURE 2 is a transverse sectional view taken substantially along the plane defined by reference line II—II of FIGURE 1.

FIGURE 3 is a fragmentary vertical sectional view of another embodiment of the furnace of the type shown in FIGURE 1.

FIGURE 4 is a fragmentary sectional view taken substantially along the plane defined by reference line IV—IV of FIGURE 3.

FIGURE 5 is a vertical sectional view similar to FIGURE 1 but showing still a further furnace constructed in accordance with the present invention.

FIGURE 6 is a fragmentary sectional view taken substantially along the plane defined by reference line VI—VI of FIGURE 5.

FIGURE 7 is an enlarged fragmentary vertical sectional view showing another embodiment of the furnace illustrated in FIGURE 5.

FIGURE 8 is an enlarged fragmentary transverse sectional view which may be considered as being taken along the plane defined by reference line VIII—VIII of FIGURE 5.

With more particular reference to the drawings, FIGURES 1 and 2 illustrate a furnace which comprises a tank 1 having a bottom 2, low walls 3, front wall 4, and a back wall which is not shown. The top of the furnace is closed by a vault 5 which is supported by the piers 6. A small portion of the tank 1 adjacent to the front wall 4 is not covered by the vault 5 and forms the charging compartment 7. The piers 6 have openings 8 provided therethrough so that fuel and combustion air can be introduced into the furnace through the openings. Further along in the tank and in a portion which is not shown in the drawings, is the glass extraction compartment.

In accordance with the present invention a row of tubes are placed in a plane which is at right angles to the longitudinal axis of the furnace and in a vertical plane. These tubes 9 are connected to a distributor pipe 10 which is disposed below the bottom 2 of the furnace and fed with air under pressure by a ventilator or fan 11.

When the furnace is in operation the tank 1 is filled with molten glass. The vitrifiable masses are then placed on the surface of the bath in the compartment 7. A feeding or charging device, which is not shown in the drawing, spreads the material out in the form of a sheet 12 and moves it forwardly inside the furnace. The vitrifiable material melts progressively due to the effect of the flames produced by combustion of the fuel fed in through the openings 8. Thus, the sheet 12 becomes thinner and thinner and gradually disappears along line 13. Beyond this line a film 14 of light glass which is rich in silica remains on top of the molten glass. This glass hardly tends to mix with the underlying glass because of its low density and its high surface tension. On the contrary, because of this high surface tension the glass has a tendency to form strings which gather and may be extracted and incorporated into the finished product in which they form defects or flaws.

It has been found that two glass currents are formed in the tank. One of them is represented in FIGURE 1 by arrow 15 and moves in the direction of the extraction compartment. The other one is represented by arrow 16 and is located below the first current and moves in the opposite direction. The lower current covers generally two-thirds of the entire height of the glass bath.

The tubes 9 are so disposed that their openings 17 open right into the molten glass above the lower current 16. The compressed gas blown by the ventilator is fed to the tubes 9 through the pipe 10 and this compressed air or gas then rises in the bath to form bubbles 18. Such bubbles drag along with the molten glass of the current 15 and, at the same time, mixes it intimately with the light glass forming the film 14. It has indeed been observed that any trace of the film at the level of tubes 9 in the direction of flow has disappeared when such bubbles are provided.

FIGURES 3 and 4 illustrate another embodiment of the present invention in which the tank 1 is provided with a hollow beam 19 which partially bars the furnace widthwise. This hollow beam 19 is anchored in the low walls 3 which, for this purpose, are provided with openings 20. The pipe 10 is disposed in the channel 21 inside of the beam 19. Tubes 9 pass through the upper walls 22 of the beam and empty into the lower portion of the upper glass current 15.

FIGURES 5 and 6 illustrate a further embodiment of the invention in which the furnace is constructed of the same elements as the furnace shown in FIGURES 1 and 2. The tank 1 is provided with a wall 23 along its bottom. This wall has openings 24 provided therethrough so that the lower current 16 can pass through it, that is, it will not block the movement of the lower current. A pipe 25 is disposed on the wall 23. The upper portion of this pipe is provided with orifices 26 through which the gas, which is blown in by the ventilator 11, emerges in the form of bubbles 18. These orifices 26 are sufficiently close to each other that each thread of molten glass which passes over them is dragged along by the bubbles which come from at least two of these orifices and this insures a very effective mixing of the glass mass.

What can also be used is a pape 25 which is slit over the entire length of the upper surface. Such a pipe produces a very dense screen of fine bubbles which provides a very good effect, that is, it is very efficient.

The mode of operation of this furnace is similar to the one of the furnace shown in FIGURES 1 and 2. However, it should be noted that the tubes 9 of the furnace shown in FIGURES 1 and 2, and which produce the screen of bubbles 18, is disposed outside of the range of tank 1 which is affected by the flames, and in contradistinction to this the pipe 25 of the furnace shown in FIGURES 5 and 6 is located in the region where the flames coming out of the opening 8 directly heat the glass bath.

FIGURE 7 shows a further embodiment of the invention in which two pipes 25' are disposed on a hollow wall 27 which can be cooled by circulating a gaseous refrigerant, such as cold air, through the channel 28. The pipes 25' are provided with discharge tubes 29 which project upwardly and have outlets 30 positioned in the glass current 15 so that these tubes lead the air bubbles 18 into the glass current. Despite the fact that one pipe 25' is generally sufficient it can be seen that the use of several such pipes makes it possible to obtain better thomogenization.

With more particular reference to FIGURE 8 it can be seen that the pipe 25 is disposed on the refractory masonry 31 which rests on the furnace bottom 2.

Using the means described in these embodiments of the invention, a screen of bubbles can be produced which extends over the entire width of the tank 1 of the furnace. This can be along a straight line, a broken line, or a curved line, depending upon the character of the device used for injecting the bubbles into the molten glass.

It is also possible to try to locate those threads of the upper current 15 which actually feed the extracting and shaping apparatus for the glass and place the means for injecting the gas bubbles only under these threads. It is known that the other portions of the current move toward the side walls of the furnace where the glass moves downwardly and feeds the lower current 16. Therefore it is not necessary to insure homogenization of these portions of the molten glass.

The ventilator 7 could be replaced by other air compressing devices or sources such as a tank or reservoir which contains gas under pressure. Also, instead of air other gases such as nitrogen or carbon dioxide may be used. All of the embodiments have been presented as examples and they can be combined or modified within the scope of the present invention.

It can thus be seen that a process and an arrangement has been disclosed wherein, although the gases may be injected advantageously below the composition layer, they are preferably injected into the molten glass mass at a short distance from the zone where the vitrifiable mixture is completely molten, this short distance being closer to the extraction zone or measured in the direction of flow. Thus, the surface film is incorporated into the molten glass mass in the vicinity where the film is formed. The formation of strings is also prevented. These strings would be formed due to the high surface tension of the film. It can be seen that it would be even more difficult to mix the film with the glass if it was in the form of strings. Also, particles of the vitrifiable mixture are prevented from being incorporated into the lower current for otherwise this would prevent the ready melting of the mixture.

It can be seen that the gases are injected into the mass in those portions of the current which feeds toward the extraction zone. It is known that certain portions of the current move towards the partition walls of the furnace and then, due to cooling, descend and joint the lower cooling current moving in the opposite direction. It is not as useful to assure the homogenization in these portions of the current which do not directly feed the apparatus which extract and shape the molten glass.

Preferably the gases are injected into the molten glass mass at several points. The distance between these points should be smaller than the diameter of the zone which is affected by a gas injection point. It is known that at this injection point the action of the column of bubbles which rises provides what may be thought of as a vertical cylinder of molten glass or zone of effectiveness. By placing the injection points sufficiently close to each other these fictitious cylinders are superimposed or overlap each other and thus form a screen or curtain through which the molten glass must pass and therein be homogenized.

It can also be seen that there has been described a furnace for accomplishing the above-mentioned process for the melting and processing of glass. Such a furnace includes a melting zone which communicates with an extracting zone. In the furnace a current of molten glass flows from the melting zone toward the extracting zone and this current flows on top of a second cooler current which moves in the opposite direction. Gas injection devices are provided which have at least one orifice for injecting gases under pressure into the molten glass. The orifice is disposed at a level which corresponds approximately to the level where the two currents come together or are adjacent to one another. In an advantageous arrangement the injection device can be either a tube constructed of a porous refractory material or at least one tube which has at least one orifice which opens into the interior of the furnace. The first-mentioned tube renders possible the injection of a large number of small bubbles whereas the second tube insures the injection of bubbles of a larger diameter.

Preferably the orifice for injecting gases under pressure is disposed at a distance from the bottom of the furnace which is substantially equal to two-thirds of the height of the molten glass within the furnace. It has been found that injection of the gases at this height assures excellent homogenization of the upper current of molten glass.

The injection device for the gases is preferably provided with several injection orifices which are spaced apart a distance smaller than the diameter of the zone is affected by each orifice.

The furnace is advantageously provided with supports for the injection devices which are disposed within the mass of molten glass. This assures that the injection devices, which are generally made of tubes, will not bend or break under the combined influence of their weight and the current of molten glass. Such supports can be constructed by a wall or pillars resting on the bottom of the furnace or by a hollow beam which is supported by the side walls of the furnace. When a wall is provided as a support it is preferably provided with at least one opening for allowing the cooler glass current to flow past the wall. When a particular furnace is used, one of the above-described arrangements is used which particularly suits the special characteristics of the furnace, and for example, in the widest furnace pillars or a wall are used rather than a beam.

The supports are preferably provided with pipes which are connected to a device for injecting gases under pressure and are capable of supplying these devices with gas. This prevents the pipes from coming into contact with the molten glass. In addition they can be protected against the heat by cooling them interiorly of the supports.

It will be understood that the above description of the present invention is susceptible to various modifications, changes, and adaptations, and the same are intended to be comprehended within the meaning and range of equivalents of the appended claims.

What is claimed is:

1. A process for homogenizing a vitrifiable material in the form of a substantially horizontal current of molten glass which moves from a melting zone to an extraction zone in a furnace and which flows over another substantially horizontal current of molten glass which is cooler than, and which flows in the opposite direction from, the first-mentioned current, comprising injecting a gas under pressure into the molten glass substantially at the level constituting the boundary between the two currents.

2. A process as defined in claim 1 wherein the gas is injected into the molten glass at a small distance, in the flow direction, from the zone where the melting of the vitrifiable material is completed.

3. A process as defined in claim 1 wherein the gas is injected only into those portions of the molten glass current which flows directly to the extraction zone.

References Cited

UNITED STATES PATENTS

| | | | |
|---|---|---|---|
| 2,254,079 | 8/1941 | McAlpine | 65—135 |
| 3,015,190 | 1/1962 | Arbeit | 65—134 |
| 3,104,967 | 9/1963 | Beck et al. | 65—135 |
| 3,206,291 | 9/1965 | Penberthy | 65—134 |
| 3,219,427 | 11/1965 | Hymowitz | 65—134 |
| 3,265,485 | 8/1966 | Carney et al. | 65—134 |
| 3,305,340 | 2/1967 | Atkeson | 65—134 |
| 3,330,639 | 7/1967 | Boettner et al. | 65—135 |

DONALL H. SYLVESTER, *Primary Examiner.*

E. R. FREEDMAN, *Assistant Examiner.*